United States Patent

Wooster et al.

[15] 3,668,173

[45] June 6, 1972

[54] NOVEL POLYURETHANE-UREA COMPOSITION

[72] Inventors: George Sidney Wooster, Hamburg; Voldemar Kirss, Buffalo, both of N.Y.

[73] Assignee: Allied Chemical Corporation, New York, N.Y.

[22] Filed: Dec. 10, 1969

[21] Appl. No.: 884,003

[52] U.S. Cl. ............260/32.6 N, 260/33.4 UR, 260/33.6 UB, 260/75 NH, 260/77.5 AM, 260/77.5 SP
[51] Int. Cl. ..................C08k 1/44, C08g 51/44, C08g 51/34
[58] Field of Search ................260/32.6 N, 75 NH, 77.5 AM, 260/77.5 SP, 584 B, 33.6, 33.4

[56] References Cited

UNITED STATES PATENTS 3,359,243  12/1967  Criner....................................260/77.5
3,454,671  7/1969  Oertel..............................260/75 NH

*Primary Examiner*—Morris Liebman
*Assistant Examiner*—S. L. Fox
*Attorney*—Jay P. Friedenson

[57] ABSTRACT

Production of a novel polyurethane-urea composition by (1) reaction of a hydroxy-terminated polymer with an excess of saturated organic diisocyanate to produce an isocyanate-terminated prepolymer and (2) reaction of said prepolymer and a non-aromatic amine comprising a polyoxyalkylene primary diamine. This novel polymer when dissolved in a volatile lacquer solvent is characterized by a low, substantially constant viscosity. The polymer solution provides on evaporation of solvent a thermoplastic coating of excellent weathering and non-blocking characteristics.

17 Claims, No Drawings

NOVEL POLYURETHANE-UREA COMPOSITION

CROSS-REFERENCE TO RELATED APPLICATION

Co-pending, commonly assigned application of George S. Wooster and F.M. Delgado, entitled "Polyurethane Lacquer Compositions," Ser. No. 836,598, filed June 25, 1969.

BACKGROUND OF THE INVENTION

1. Field of the Invention

This invention relates to a novel polyurethane composition and more particularly to a novel polyurethane-urea. It is especially concerned with a novel low viscosity polyurethane-urea coating composition.

2. Description of the Prior Art

British Pat. No. 1,150,818 discloses reaction of isocyanate-terminated prepolymers derived from saturated organic diisocyanates with primary non-aromatic diamines, for example, p-methane-1,8-diamine, to obtain linear polyurethane ureas suitable for coatings. These polymers, which are generally prepared and applied to substrata as solutions in volatile solvents, are impractically viscous. In other words solutions of such polymers have viscosities as great as 100,000 centipoises or more at moderately high polymer concentrations corresponding to about 30 to 50 weight percent dissolved polymer. Although the viscosity of the dissolved polymer can be diminished by use of a mixed solvent as described in copending application of G.S. Wooster and F.M. Delgado mentioned supra, the prior art polymer solutions are so viscous as to require thinning with large amounts of solvents to obtain stirrable compositions suitable for blending with insoluble pigments, fillers and the like. The excessive viscosity of prior art polyurethane-urea coating solutions also limit their application. For example, spray-application of these compositions is feasible only after thinning with large costly amounts of solvent. The resultant solutions are not only undesirably dilute, that is to say, contain less than about 10 percent by weight dissolved polymer, but are also difficult to manipulate.

In addition to the foregoing disadvantages, known polyurethane urea coatings are of poor thermal stability as evidenced by the deterioration of the gloss of the pigmented polymer at elevated temperature which is illustrated in Example 12 below.

It is a principal object of the present invention to devise novel low viscosity polyurethane-urea coating compositions.

It is another object of the invention to devise novel polyurethane ureas of improved thermal stability.

These and other objects and advantages will be apparent from the following description of our invention.

SUMMARY OF THE INVENTION

According to the invention the disadvantages of the foregoing prior art coating compositions are overcome and the above objects are attained in a novel polyurethane-urea composition comprising the product of reaction of (1) a polyol having an average molecular weight within the range of about 350 to 5,000 selected from hydroxy-terminated polyesters, hydroxy-terminated polyethers and hydroxy-terminated polyester-polyethers with (2) an excess of saturated organic diisocyanate whereby an isocyanate-terminated prepolymer is formed and (3) subsequent reaction of the said prepolymer with a non-aromatic amine reactant comprising a polyoxyalkylene primary diamine of the formula:

$$H_2N - (RO)_x - R - NH_2$$

wherein R represents an alkylene radical containing two to 10 carbon atoms, $x$ is an integer greater than zero, said diamine having a molecular weight in the range of about 150 to 5,000.

The compositions of the invention are surprisingly less viscous than comparable polyurethane-urea compositions chain-extended with conventional non-aromatic primary diamines as is illustrated by the comparisons in Examples 1-11 below. Unexpectedly also, the novel polyurethane-ureas are more stable to temperatures above 100° C., than the aforementioned prior art polyurethane-ureas. Example 12 below illustrates this surprising improvement by comparison of the gloss-retention of a pigmented polymer of this invention with that of a known pigmented polyurethane-urea.

DETAILED DESCRIPTION OF THE INVENTION AND OF THE PREFERRED EMBODIMENTS THEREOF

The polyurethane urea of the invention can be prepared by reacting a hydroxyl-terminated polyester, polyether, or polyester-polyether with a stoichiometric excess of the diisocyanate to form an isocyanate-terminated prepolymer. The prepolymer is subsequently chain extended with at least about 0.8 equivalent of the amine reactant per equivalent of the prepolymer. The techniques of the prepolymer formation and chain extension are similar to those disclosed in the aforementioned British Pat. No. 1,150,818. Preferably, to obtain a polymer of stable, consistent viscosity, the amine reactant should contain a small amount, say about 0.1 to 0.3 equivalent per equivalent of the prepolymer, of a bis-(lower alkyl) monoamine as polymer chain-terminator. Prepolymer formation is advantageously effected in solution employing a volatile inert organic solvent, such as toluene, xylene and the like. The chain extension reaction is desirably effected in solution employing a volatile organic lacquer solvent such as xylene, toluene, kerosene, methoxyethyl acetate, dimethyl formamide, dimethyl acetamide and butyl acetate and, preferably, the solvent mixture described in the aforementioned application of G.S. Wooster et al.

The solvent mixtures of the latter application contain about 10 to 60 percent of a nitrogen-containing solvent, about 20 to 60 percent of an aromatic solvent and about 10 to 40 percent of an alcoholic solvent based on the weight of the mixture, and have a solubility parameter, $\delta$, of about 8.5 to 11.5, said solubility parameter being defined by the equation:

$$\delta = \left(\frac{\Delta \epsilon}{V}\right)^{1/2}$$

wherein $\Delta \epsilon$ and $\nu$ represent, respectively, the energy of vaporization and the molar density of the solvent mixture.

With respect to the use of the latter mixed solvent in the present invention, a mixture of about 20 to 25 weight percent dimethylacetamide, about 45–55 weight percent toluene and about 25 to 30 weight percent isopropanol provides an especially good result. Because of the unusually low viscosity of the present polymer when dissolved in the foregoing solvents, the amount of solvent charged can be relatively small, for example, an amount sufficient to provide about a 30 to 50 or more weight percent solution of the polymer.

The polymer solution obtained as product of the above processes can be readily applied to substrata, e.g. microcellular polyurethane foam, by brushing, dipping, flow-coating and other conventional means. If desired the polymer solution can be rendered sprayable by dilution to a Brookfield viscosity below about 100 centipoises at ambient temperature employing a low viscosity volatile organic solvent, such as, for example, a solvent having a Ford cup viscosity of about 8 to 10 seconds such as was charged in Example 12B below. Even after such dilution, sprayable formulations of the present polyurethane-urea contain a relatively large concentration of dissolved sometimes amounting to as much as 10 to 20 or more percent polymer based on the weight of the solution.

Liquid coatings of the present polymer on substrata are readily cured or dried by conventional techniques such as air-drying, baking in a heated oven or like methods designed to evaporate the solvents employed. The cured coatings are clear thermoplastic films having excellent weathering and non-blocking characteristics. If an opaque coating is desired, titanium dioxide or other conventional pigment or filler of the type disclosed in J. H. Saunders and K. C. Frisch "Polyurethanes" Part II, Interscience 1964, p. 532–535 may be readily dispersed in the low viscosity polymer solution of the invention prior to the coating application. Cured pigmented coatings of the invention are characterized by a high enamel-like gloss which is not substantially diminished by heating for example at temperatures above 100° C.

In order to obtain a polyurethane-urea composition of stable viscosity according to the invention we employ for each equivalent of prepolymer charged at least about 0.8 equivalents of the amine reactant, that is to say, of the polyoxyalkylene diamine and any secondary monoamine charged. Use of more than about 1.2 equivalents amine reactant per equivalent prepolymer, while effective, provides a coating composition containing an excessive amount of unreacted amine which is readily discolored by light. Charging an exact stoichiometric ratio of amine reactant to prepolymer provides a polyurethane-urea of molecular weight approaching infinity and hence of an undesirably large viscosity. Accordingly use of such a 1.0:1.0 ratio of equivalents amine reactant to equivalents prepolymer is to be avoided also. Preferably about 0.85 to 0.98, and especially about 0.93 to 0.98 equivalent amine reactant per equivalent prepolymer is employed in preparing the present polymers. In preparing the novel compositions in accordance with the foregoing preferred ratio, the preferred alcohol-containing solvent of the invention is desirably charged in an amount providing a number of equivalents alcohol per equivalents prepolymer which is at least equal to the numerical difference of said ratio and unity, thereby providing a polyurethane-urea devoid of unreacted isocyanate groups.

The saturated organic diisocyanates employed in the present invention are aliphatic and cycloaliphatic diisocyanates which are devoid of carbon-carbon unsaturation. Typical suitable diisocyanates include the following representative examples:

4,4'-methylene-bis-(cyclohexylisocyanate)
 1,6-hexamethylenediisocyanate
 1,5-pentamethylenediisocyanate
 4,4'-dicyclohexyldiisocyanate
 p-menthane-1,8-diisocyanate
 isophorone diisocyanate
 1-methyl-cyclohexyl-2,4-diisocyanate
 1-methyl-cyclohexyl-2,6-diisocyanate Preferably a cycloaliphatic diisocyanate and especially 4,4'-methylene-bis-(cyclohexylisocyanate) is employed in the present invention.

The polyols employed in the present invention are hydroxy-terminated polyethers, polyesters or polyester-polyethers of an average molecular weight of about 350 to 5,000, which contain two or more terminal hydroxy radicals. Typical hydroxy-terminated polyethers include the following representative examples:

polyoxytetramethylene diols,
 hydroxy-terminated copolymers of:
 glycerine and 1,2-propylene oxide
 ethylene glycol and ethylene oxide
 neopentyl glycol and ethylene oxide
 1,2-propylene glycol and 1,2-propylene oxide
 2,2-bis(p-hydroxyphenyl)propane and 1,2-propylene oxide
 a,a,a',a'-tetramethyl a,a'bis(p-hydroxyphenyl)-p-xylene and ethylene oxide
 tetrahydrofuran and 1,2-propylene oxide
 tetramethylene tetrol and ethylene oxide Typical suitable hydroxy-terminated polyesters include the following representative examples:

hydroxy-terminated polyepsilon caprolactone
 hydroxy-terminated copolymers of:
 glycerine and adipic acid,
 1,2 propylene glycol and succinic acid
 1,3 propylene glycol and succinic acid
 diethylene glycol and phthalic acid
 1,4 butylene glycol and dimethyl maleic acid
 2,2-diethyl 1,3-propylene glycol and isophthalic acid
 ethylene glycol and 2-methyl terephthalic acid
 diethylene glycol and isophthalic acid
 1,3 propylene glycol and tetrachloroterephthalic acid
 neopentyl glycol and adipic acid (i.e. neopentyl adipate polyester diol)
 neopentyl glycol and isophthalic acid (i.e. neopentyl isophthalate polyester diol), and
 diethylene glycol and adipic acid (i.e. diethylene glycol adipate polyester diol)

Typical suitable hydroxy-terminated polyester-polyethers are represented by hydroxy-terminated copolymers of any of the foregoing or equivalent polycarboxylic acids and the previously listed polyether polyols.

Preferably the polyol employed is a diol and especially a polyester diol or mixture thereof with a polyether diol.

The polyoxyalkylene primary diamines employed as chain-extending agents in preparing the novel polyurethanes are a known class of polyether diamines which are structurally defined in U.S. Pat. No. 3,359,243 which is incorporated herein as reference. Representative examples of suitable polyoxyalkylene diamines include polyoxyethylene diamines, polyoxypropylenediamines, polyoxytetramethylene diamines as well as mixtures of these and equivalent diamines listed in the aforementioned patent. Preferably we employ a polyoxyalkylenediamine having a molecular weight in the range of about 190 to 2,000. Polyoxypropylenediamines of the aforementioned preferred molecular weight range provide an especially good result according to the invention.

The bis-(lower alkyl) monoamines employed as chain-terminating agents according to a preferred embodiment of the invention contain alkyl groups of one to six carbon atoms. Typical examples of suitable secondary aliphatic amines include:

di-isopropylamine
 di-n-butylamine
 di-n-propylamine
 methyl isopropyl amine
 di-n-pentylamine
 di-sec-butylamine
 diethylamine
 di-n-hexylamine Mixtures of these and equivalent bis-(lower alkyl) monoamines can be employed also. Di-n-butyl amine gives an especially good result, and hence is to be preferred.

The novel polyurethane-urea compositions dissolve in known organic lacquer solvents to provide relatively low viscosity coating solutions containing the dissolved polymer in concentrations of about 30 to 50 weight percent or more. These polymers can also be incorporated in sprayable coating solutions containing 10 to 20 weight percent or more dissolved polymer. Formulation of such concentrated solutions avoids the costly, impractically large volumes of solvents required to thin the viscous polyurethane-ureas of the prior art. The polymers of the invention are more thermally stable than prior art polyurethane-ureas and hence provide pigmented coatings which retain their attractive gloss on heating to elevated temperatures.

In the following examples which serve to illustrate our invention parts, percentages and proportions are by weight unless otherwise noted and temperatures are in degrees Centigrade.

EXAMPLE 1

A mixture of 580 parts (2.0 equivalents) of neopentylisophthalate polyester diol and 368 parts of toluene is dried by azeotropic distillation at atmospheric pressure employing a Dean-Stark trap to collect the condensed toluene water azeotrope and to recycle the separated toluene layer of the azeotrope to the still. The resultant dried distilland is cooled to about 80°–90°, agitated with 524 parts (4.0 isocyanate equivalents corresponding to about 2 equivalents per equivalent of polyol) of 4,4'-methylene-bis-(cyclohexylisocyanate) at 120° for 2.5 hours and cooled to ambient temperature to obtain a toluene solution (containing about 75 percent dissolved non-volatiles) of isocyanate-terminated prepolymer having an amine equivalent of 765.

A mixture of 114.8 parts of the prepolymer solution (containing 0.15 equivalents of the prepolymer) 63.8 parts (0.1273 equivalents, corresponding to about 0.85 equivalent per equivalent of the prepolymer) of a polyoxypropylene primary diamine (molecular weight about 1,000; equivalent weight about 500) 2.52 parts of di-n-butylamine (0.0195 equivalent corresponding to about 0.13 equivalent per equivalent of the prepolymer isocyanate) and about 190.8 parts of a solvent mixture containing 45 percent toluene, 25 percent N,N-dimethylacetamide and 30 percent isopropylalcohol is agitated for 1.5 minutes at ambient temperature. An additional 53.6 parts of the foregoing solvent mixture is charged and the polymerization mass is agitated for about 35 minutes (during which period the temperature of the mass increases by about 12°). The resultant solution is allowed to stand at ambient temperature for about 16 hours. There is thus obtained a clear solution of polyurethane-urea having a dissolved non-volatile concentration of about 35 percent, a platinum-cobalt color of about 150 and a Brookfield viscosity of 342 centipoises (determined at 25° with a No.2 spindle at 20 revolutions per minute).

EXAMPLE 2

The following example illustrates the relatively high viscosity polyurethane-urea obtained employing a non-aromatic primary diamine other than that prescribed by the invention as chain extending agent for the prepolymer isocyanate.

The procedure of Example 1 is repeated substantially as described except that p-menthane-1,8-diamine-(0.85 equivalent per equivalent of the prepolymer isocyanate) is employed as chain extender instead of the polyoxypropylene primary diamine. The resultant polymer solution (35 percent non-volatiles content) has a Brookfield viscosity of 30,440 centipoises at 25° (determined with a No. 5 spindle at 10 r.p.m.).

EXAMPLES 3 – 11

In Examples 3 to 11 summarized in the table below, the procedure of Example 1 is repeated substantially as described in preparing polymer solutions containing the 35 percent non-volatiles employing different isocyanate-terminated prepolymers, different aliphatic diamine chain terminating agents, and in Examples 3–9, different ratios of equivalents aliphatic diamine:equivalents prepolymer and of equivalents dibutylamine:equivalents prepolymer. Examples 4, 6, 9 and 11 are comparative examples illustrating preparation of polymers of high viscosity which result from use of non-aromatic diamine chain extending agents other than those prescribed by the invention.

TABLE 1

| Example | Isocyanate-terminated prepolymer | Aliphatic primary diamine charged | Eq. diamine per eq. prepolymer | Eq. dibutyl amine per eq. prepolyme | Solvent | Brookfield viscosity of the resultant polymer solution at 25° (centipoises) |
|---|---|---|---|---|---|---|
| 3 | Reaction product (Amine eq. 1014) of 1.6 eq. of the diisocyanate of Ex. 1 and 0.64 eq. of a neopentyl adipate polyester diol (equivalent wt. 440), 0.16 eq. of a polyoxypropylene diol (a hydroxy-terminated copolymer of 1,2-propylene glycol and 1,2-propylene oxide of equivalent weight 515), in 191.2 parts toluene corresponding to 0.15 eq. prepolymer. | Polyoxypropylene diamine of an equivalent weight of about 96.1. | 0.80 | 0.18 | 202 parts of the solvent mixture of Ex. 1. | 500 (No. 3 spindle, 20 r.p.m.) |
| 4 | As In Ex. 3 | As in Ex. 2 | As in Ex. 3 | As in Ex. 3 | 199.3 pts. of the solvent mixture of Ex. 1. | 2,380 (No. 5 spindle, 20 r.p.m.) |
| 5 | Reaction product (Amine eq. 932) of 1.6 eq. of the diisocyanate of Ex. 1 and 0.64 eq. of the polyester diol of Ex. 3, 0.16 eq. of a polyoxypropylene diol (a hydroxy-terminated copolymer of 1,2-propylene glycol and 1,2-propylene oxide of equivalent weight 204) in 174.6 parts toluene corresponding to 0.15 eq. prepolymer. | As in Ex. 3 | As in Ex. 3 | As in Ex. 3 | 187.7 parts of the solvent mixture of Ex. 1. | 555 (No. 3 spindle, 20 r.p.m.). |
| 6 | As in Ex. 5 | As in Ex. 2 | As in Ex. 3 | As in Ex. 3 | 185.2 parts of the solvent mixture of Ex. 1. | 4,960 (No. 5 spindle, 20 p.r.m.). |
| 7 | Reaction product (Amine eq. 1018) of 3 eq. of the diisocyanate of Ex. 1 and 1.5 eq. of the polyester diol of Ex. 3 in 351 parts toluene corresponding to 0.15 eq. prepolymer. | As in Ex. 3 | As in Ex. 3 | As in Ex. 3 | 202.4 parts of the solvent mixture of Ex. 1. | 245 (No. 2 spindle, 20 r.p.m.). |
| 8 | Prepolymer solution of Ex. 7 corresponding to 0.075 eq. prepolymer. | Polyoxypropylene diamine having an equivalent weight of about 980.4. | As in Ex. 3 | As in Ex. 3 | 199.4 parts of the solvent mixture of Ex. 1. | 151 (No. 1 spindle, 20 r.p.m.). |
| 9 | As in Ex. 7 | As in Ex. 2 | As in Ex. 3 | As in Ex. 3 | 200 parts of the solvent mixture of Ex. 1. | 2,940 (No. 5 spindle, 20 r.p.m.). |
| 10 | Prepolymer solution of Ex. 7 corresponding to 0.14 eq. prepolymer. | As in Ex. 3 | As in Ex. 1 | As in Ex. 1 | 188.5 parts of the solvent mixture of Ex. 1. | 980 (No. 3 spindle, 20 r.p.m.). |
| 11 | As in Ex. 10 | As in Ex. 2 | As in Ex. 1 | As in Ex. 1 | 186 parts of the solvent mixture of Ex. 1. | 7,840 (No. 5 spindle, 20 r.p.m.). |

EXAMPLE 12

The following example illustrates the preparation of pigmented coating compositions according to the invention and the excellent thermal stability of the gloss thereof.

PART A

A mixture of 220 parts of the polymer solution of Example 1 and 77 parts of pulverulent titanium dioxide is vigorously agitated in a Cowles dissolver. The resultant homogeneous pigmented dispersion is drawn down on a flat Teflon substrate, heated at 85° for 1 hour to evaporate solvent, and separated as a film from the substrate. The resultant film has a slippery surface feel and exhibits excellent non-blocking character. On heating the film softens without substantial degradation or discoloration indicating its thermoplastic nature. The specular gloss of the pigmented film is measured with a Gardner 60° Glossmeter according to ASTM procedure D523–62T prior to and subsequent to heating the sample in an oven at 150° for 30 minutes. The results of this example are reported in Table 2 below.

PART B

In a comparative experiment the foregoing procedure is repeated substantially as described employing 200 parts of the polymer solution of Example 2 and 69.4 parts of titanium dioxide pigment. About 80 parts of a mixture of 58 percent methyl ethyl ketone, 20.6 percent isopropanol, 14.2 percent butyl cellosolve and 7.2 percent n-butanol is charged to the viscous polymer solution - pigment mixture to provide a stirrable mass containing about 25 percent dissolved non-volatiles. The results of this experiment are compared with those of Part A in Table 2.

TABLE 2

| Example | Polymer Solution Charged | Gloss* Prior To Heating | After Heating |
|---|---|---|---|
| 12A | Product of Ex. 1 | 90.5 | 90 |
| 12B | Product of Ex. 2 | 90 | 86.5 |

*each figure reported is the average of two samples.

The foregoing comparison illustrates the substantially greater thermal stability of polymer compositions of the invention compared to similar polymers chain-extended with non-aromatic primary diamines other than those of this invention.

EXAMPLE 13

PART A

The polymer solution of Example 1 is brushed on the surface of a microcellular polyurethane foam and exposed to air at ambient temperature to evaporate the solvent. There is thus obtained an excellent thermoplastic coating on the foam substrate.

PART B

A 200 part sample of a polymer solution prepared as in Example 1 is diluted with 500 parts of a solvent mixture consisting of 30 percent cyclohexanone, 30 percent methylethyl ketone, 30 percent xylene and 10 percent butyl cellosolve to provide a solution (containing 10 percent dissolved non-volatiles) of sufficiently low viscosity that is, 11.1 seconds Ford cup viscosity (determined with a No. 4 cup; corresponding to a Brookfield viscosity below about 100 centipoises) to permit application of the solution by spraying. The polymer solution is sprayed on microcellular urethane foam and provides an excellent coating on evaporation of solvent on exposure to air under ambient conditions.

We claim:

1. A novel polyurethane-urea composition comprising the product of reaction of (1) a polyol having an average molecular weight within the range of about 350 to 5,000 selected from hydroxy-terminated polyesters, hydroxy-terminated polyethers and hydroxy-terminated polyester-polyethers with (2) an excess of a saturated organic diisocyanate whereby an isocyanate-terminated prepolymer is formed and (3) subsequent reaction of said prepolymer with a non-aromatic amine reactant employing about 0.8 to about 1.2 equivalents of said amine reactant per equivalent of said prepolymer, said amine reactant comprising a polyoxyalkylene primary diamine of the formula:

wherein R represents an alkylene radical containing two to 10 carbon atoms and $x$ is an integer greater than 0, said amine reactant containing about 0.1 to 0.3 equivalent per equivalent of said prepolymer of a bis-(lower alkyl)monoamine and said diamine having a molecular weight in the range of about 150 to 5,000.

2. A composition as defined in claim 1 wherein said polyol is a hydroxy-terminated polyester.

3. A composition as defined in claim 1 wherein said polyol is a mixture of a hydroxy-terminated polyester and a hydroxy-terminated polyether.

4. A composition as defined in claim 1 wherein said polyol is a diol.

5. A composition as defined in claim 1 wherein said saturated organic diisocyanate is a cycloaliphatic diisocyanate.

6. A composition as defined in claim 5 wherein said cycloaliphatic diisocyanate is 4,4'-methylene-bis-(cyclohexylisocyanate).

7. A composition as defined in claim 1 wherein said polyoxyalkylene primary diamine has a molecular weight in the range of about 190 to 2,000.

8. A composition as defined in claim 1 wherein said polyoxyalkylene primary diamine is a polyoxypropylene diamine.

9. A composition as claimed in claim 1 wherein the reaction of said prepolymer and said non-aromatic amine is effected in a volatile organic solvent said solvent being a mixture having a solubility parameter of about 8.5 to 11.5 and containing 10 to 60 percent of a nitrogen-containing solvent, about 20 to 60 percent of an aromatic solvent and about 10 to 40 percent of an alcoholic solvent based on the weight of the mixture.

10. A composition as defined in claim 9 wherein said solvent is a mixture of about 20 to 25 percent dimethylacetamide, about 45 to 55 percent toluene, and about 25 to 30 percent isopropanol based on the weight of the mixture.

11. A composition as defined in claim 1 wherein about 0.85 to 0.98 equivalent of said non-aromatic amine reactant per equivalent prepolymer is employed.

12. A composition as defined in claim 11 wherein about 0.93 to 0.98 equivalent of said non-aromatic amine reactant per equivalent prepolymer is employed.

13. A composition as defined in claim 10 wherein said polyol is a neopentyl isophthalate polyester diol having an average molecular weight of about 580, said saturated organic diisocyanate is 4,4'-methylene-bis-(cyclohexylisocyanate), and said non-aromatic amine reactant is mixture of about 0.85 equivalent per equivalent prepolymer of a polyoxypropylene diamine having a molecular weight of about 1,000 and about 0.13 equivalent per equivalent prepolymer of di-n-butylamine.

14. A composition as defined in claim 10 wherein said polyol is a mixture of a neopentyl adipate polyester diol having an average molecular weight of about 880 and a polyoxypropylene diol having an average molecular weight of about 1,030, said saturated organic diisocyanate is 4,4'-methylene-bis-(cyclohexylisocyanate) and said non-aromatic amine reactant is a mixture of about 0.80 equivalent per equivalent prepolymer of a polyoxypropylene diamine having a molecular weight of about 192 and about 0.18 equivalent per equivalent prepolymer of di-n-butylamine.

15. A composition as defined in claim 10 wherein said polyol is a mixture of a neopentyl adipate polyester diol having an average molecular weight of about 880 and a polyoxypropylene diol having an average molecular weight of about 408, said saturated diisocyanate is 4,4'-methylene-bis-(cyclohexylisocyanate) and said non-aromatic amine reactant is a mixture of about 0.80 equivalent per equivalent prepolymer of a polyoxypropylene diamine having a molecular weight of about 192 and about 0.18 equivalent per equivalent prepolymer of di-n-butylamine.

16. A composition as defined in claim 10 wherein said polyol is a neopentyl adipate polyester diol having an average molecular weight of about 880, said saturated organic diisocyanate is 4,4'-methylene-bis-(cyclohexylisocyanate) and said non-aromatic amine reactant is a mixture of about 0.80 equivalent per equivalent prepolymer of a polyoxypropylene diamine having a molecular weight of about 192 and about 0.18 equivalent per equivalent prepolymer of di-n-butylamine.

17. A composition as defined in claim 10 wherein said polyol is a neopentyl adipate polyester diol having an average molecular weight of about 880, said saturated organic diisocyanate is 4,4'-methylene-bis-(cyclohexylisocyanate) and said non-aromatic amine reactant is a mixture of about 0.80 equivalent per equivalent prepolymer of a polyoxypropylene diamine having a molecular weight of about 1,960 and about 0.18 equivalent per equivalent prepolymer of di-n-butylamine.

* * * * *